United States Patent
Shirkness et al.

(10) Patent No.: US 11,247,709 B2
(45) Date of Patent: Feb. 15, 2022

(54) APPLIANCE DOLLY WITH PACKAGING INTERFACE

(71) Applicants: Haier US Appliance Solutions, Inc., Wilmington, DE (US); Quant US Corp., Wilmington, DE (US)

(72) Inventors: Mark Daniel Shirkness, Louisville, KY (US); Blake Meade, Shelbyville, KY (US); Richard Gregory Gilbert, Louisville, KY (US); Adam Wiseman, Louisville, KY (US); Brad Geier, Louisville, KY (US); Alan Christopher Ricchio, Mt.Washington, KY (US); William Hickey, Louisville, KY (US); Adam Joel Finlay, Rineyville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/841,843

(22) Filed: Apr. 7, 2020

(65) Prior Publication Data
US 2021/0309273 A1 Oct. 7, 2021

(51) Int. Cl.
*B62B 3/04* (2006.01)
*B62B 3/10* (2006.01)

(52) U.S. Cl.
CPC .............. *B62B 3/04* (2013.01); *B62B 3/108* (2013.01)

(58) Field of Classification Search
CPC .................................. B62B 3/04; B62B 3/108
See application file for complete search history.

(56) References Cited

U.S. PATENT DOCUMENTS

| | | | | |
|---|---|---|---|---|
| 2,598,168 A | * | 5/1952 | Hooz | B62B 3/12 280/641 |
| 2,598,489 A | * | 5/1952 | Bayer | B62B 1/14 414/467 |
| 3,023,919 A | | 3/1962 | Hobson | |
| 3,363,787 A | * | 1/1968 | Macomber | B62B 3/04 414/444 |
| 3,507,413 A | * | 4/1970 | Hobson | B62B 3/04 414/454 |
| 3,643,935 A | * | 2/1972 | Bell | E04F 21/0023 269/16 |
| 3,765,550 A | * | 10/1973 | Tausheck | B65G 49/061 414/541 |
| 3,841,651 A | * | 10/1974 | Bigney | B62B 1/268 280/47.16 |
| 4,313,612 A | * | 2/1982 | Rubens | B62B 3/04 280/79.5 |
| 4,488,733 A | * | 12/1984 | Hellsten | B62B 3/108 280/47.16 |

(Continued)

*Primary Examiner* — Erez Gurari
(74) *Attorney, Agent, or Firm* — Dority & Manning, P.A.

(57) ABSTRACT

An appliance dolly includes a frame comprising a top end, a bottom end, a front end, and a back end. A platform is attached to the front end of the frame at the bottom end of the frame. A plate that is configured to engage with an appliance package between a box of the appliance package and a lid of the appliance package is disposed on the frame above the platform. The plate is movable between an engaged position between the box and the lid and a disengaged position where the plate is spaced apart from the box and the lid.

18 Claims, 3 Drawing Sheets

(56) References Cited

U.S. PATENT DOCUMENTS

| | | | | |
|---|---|---|---|---|
| 4,570,953 A * | 2/1986 | McPeak | B62B 5/023 | 280/47.29 |
| 4,630,837 A * | 12/1986 | Kazmark | B62B 1/002 | 280/47.2 |
| 5,779,251 A * | 7/1998 | Meier | B62B 1/002 | 188/22 |
| 5,947,491 A * | 9/1999 | Meier | B62B 1/002 | 280/47.2 |
| 6,341,788 B1 * | 1/2002 | Ciccone | B25H 1/00 | 280/47.28 |
| 6,508,478 B1 * | 1/2003 | Ortez | B62B 1/20 | 280/47.34 |
| 6,540,242 B1 | 4/2003 | Raichlen | | |
| 8,448,958 B2 * | 5/2013 | Price | B62B 3/02 | 280/42 |
| 8,651,500 B2 * | 2/2014 | Mitchell | B62B 3/0606 | 280/47.18 |
| 8,820,756 B2 * | 9/2014 | Hronyetz | B62B 3/02 | 280/47.34 |
| 9,139,214 B2 * | 9/2015 | Rich | B62B 5/0003 | |
| 10,160,627 B1 * | 12/2018 | Robertson | B66F 7/26 | |
| 2008/0203687 A1 * | 8/2008 | Meyers | B62B 1/12 | 280/47.18 |
| 2009/0250889 A1 * | 10/2009 | Palmore | B62B 1/002 | 280/47.21 |
| 2010/0124476 A1 * | 5/2010 | Berlinger | B62B 3/04 | 414/457 |
| 2011/0243696 A1 * | 10/2011 | DiBenedetto | B66F 9/06 | 414/490 |
| 2013/0043663 A1 * | 2/2013 | Mitchell | B62B 3/0606 | 280/47.18 |
| 2014/0145408 A1 * | 5/2014 | Midas | B62B 3/0606 | 280/47.131 |
| 2014/0159328 A1 * | 6/2014 | Bowden | B62B 1/12 | 280/47.27 |
| 2017/0044782 A1 * | 2/2017 | Carlei | E04G 21/168 | |
| 2017/0101265 A1 * | 4/2017 | Lilley | B65G 7/04 | |
| 2018/0346006 A1 * | 12/2018 | McDonald | B62B 1/008 | |

\* cited by examiner

APPLIANCE DOLLY WITH PACKAGING INTERFACE

FIELD OF THE INVENTION

The present disclosure relates generally to dollies, such as may be used for transporting large and/or heavy packages, e.g., a household appliance in full packaging.

BACKGROUND OF THE INVENTION

Household appliances such as refrigerators, washing machines, etc. are generally shipped and stored in a large package. For example, in addition to the appliance itself, such packages typically include packaging material, braces, and/or cushions such as bubble wrap, styrofoam, and the like. As a result, the package, typically a box such as a corrugated cardboard box, can become bulky and heavy to the point that lifting and moving the package requires multiple people and/or mechanical means such as a hand truck or dolly to move the package around.

However, conventional dollies in use today require additional means to secure the package on the dolly before moving, such as straps or other complicated methods. The use of such additional securing means and/or methods requires additional time and effort each time an appliance package is moved around, such as within a warehouse or when delivering the appliance to an end user.

Accordingly, a hand truck or dolly with features for securing a fully packaged appliance would be useful.

BRIEF DESCRIPTION OF THE INVENTION

Aspects and advantages of the invention are set forth below in the following description, or may be obvious from the description, or may be learned through practice of the invention.

In accordance with one embodiment of the present disclosure, an appliance dolly is provided. The appliance dolly includes a frame defining a vertical direction, a lateral direction, and a transverse direction. The vertical direction, the lateral direction, and the transverse direction are mutually perpendicular. The frame extends along the vertical direction from a top end to a bottom end and along the transverse direction from a front end to a back end. The appliance dolly also includes a platform attached to the front end of the frame at the bottom end of the frame. The appliance dolly further includes a plate configured to engage with an appliance package between a box of the appliance package and a lid of the appliance package. The plate is disposed on the frame above the platform along the vertical direction. The plate is movable along the vertical direction between an engaged position between the box and the lid and a disengaged position where the plate is spaced apart from the box and the lid.

In accordance with another embodiment of the present disclosure, an appliance dolly is provided. The appliance dolly includes a frame comprising a top end, a bottom end, a front end, and a back end. The appliance dolly also includes a plate configured to engage with an appliance package between a box of the appliance package and a lid of the appliance package. The plate is disposed on the frame above the platform. The plate is movable between an engaged position between the box and the lid and a disengaged position where the plate is spaced apart from the box and the lid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
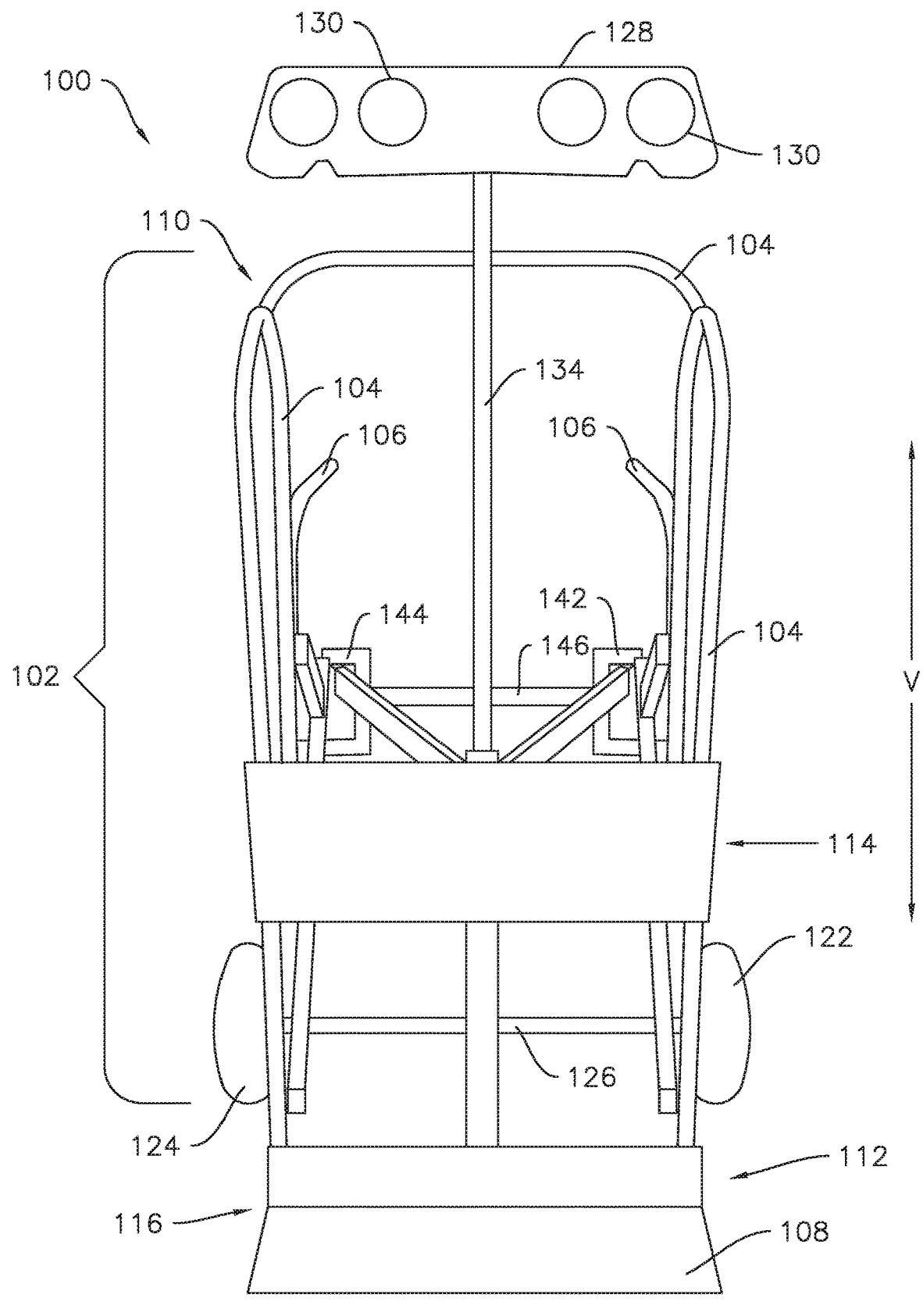
FIG. 1 provides a front view of an exemplary appliance dolly in accordance with one or more exemplary embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Repeat use of reference characters in the present specification and drawings is intended to represent the same or analogous features or elements of the present disclosure.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one element from another and are not intended to signify location or importance of the individual elements. Furthermore, it should be appreciated that as used herein, terms of approximation, such as "approximately," "substantially," or "about," refer to being within a ten percent margin of error. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
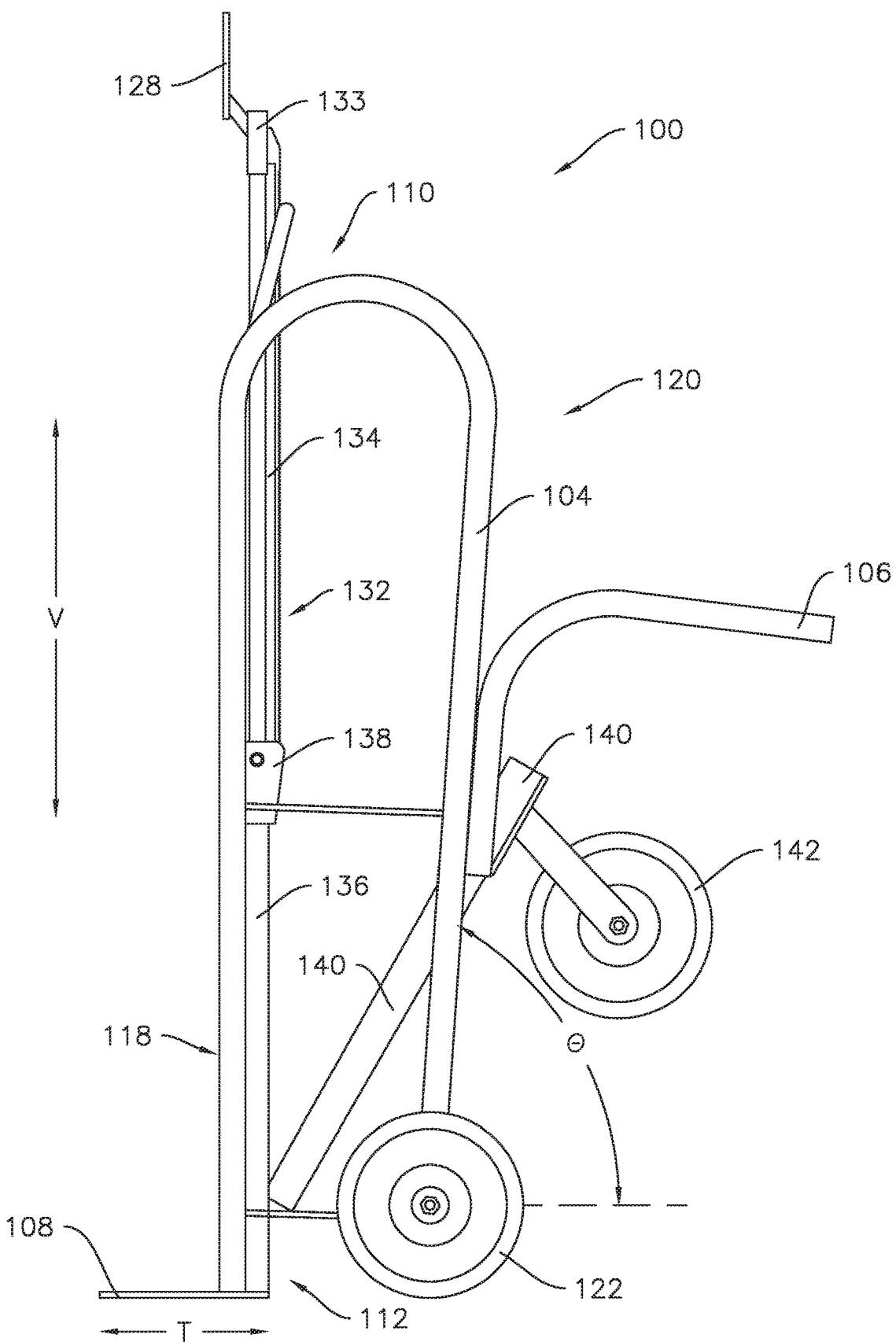
FIG. 2 provides a side view of the exemplary appliance dolly of FIG. 1.

In FIGS. 1 and 2, an appliance dolly 100 for moving and transporting appliance packages is illustrated. As used herein, appliance packages generally include at least a box with a separate lid attached to a top of the box, and contents within the box such as an appliance and packaging material. As shown, the appliance dolly 100 defines a vertical direction V, a lateral direction L (FIG. 1), and a transverse direction T (FIG. 2). The lateral direction L, transverse direction T, and vertical direction V are mutually perpendicular and define an orthogonal coordinate system.

As may be seen in FIGS. 1 and 2, in some embodiments, the appliance dolly 100 may include a frame 102. The frame 102 may include a plurality of elongated members 104. The elongated members 104 may be, e.g., tubular steel. The elongated members 104 may include straight pieces, curved pieces, and combinations thereof, which are interconnected, e.g., joined together such as by welds, mechanical fasteners, or other suitable joints, including combinations thereof.

The frame 102 may extend along the vertical direction V from a top end 110 to a bottom end 112, along the lateral direction L from a left end 114 to a right end 116 and along the transverse direction T from a front end 118 to a back end 120. It should be understood that the various ends, e.g., the left end 114 and right end 116, are defined from the perspective of a user operating the dolly 100; thus, where FIG. 1 provides a front view of the dolly 100 and the user stands behind the dolly 100 while operating the dolly 100, the left end 114 and right end 116 are reversed on the page in FIG. 1.

The dolly 100 may also include a platform 108 attached to the front end 118 of the frame 102 at the bottom end 112 of the frame 102. For example, the platform 108 may extend fully across the front end 118 of the frame 102, e.g., from the left end 114 to the right end 116, along the lateral direction L. The platform 108 may be configured, e.g., sized and positioned, to slide underneath an appliance package which is on the ground or floor. The dolly 100 may then lift and support the package by tilting the frame 102 backwards, e.g., towards the back end 120 of the frame 102 and/or towards a user operating the dolly 100. For example, the dolly may include a first pair of wheels 122 and 124 connected to the back end 120 of the frame 102 at the bottom end 112 of the frame 102. As illustrated in FIGS. 1 and 2, the first pair of wheels may include a first left wheel 122 and a first right wheel 124 which are connected by an axle 126. The first pair of wheels 122, 124 may provide the fulcrum or pivot point for rotating or tilting the dolly 100 backwards, such that when the dolly 100 is tilted backwards the package is supported on the platform 108 and the frame 102. The dolly 100 with the package thereon may be moved about by rolling the dolly 100 on the first part of wheels 122, 124.

In some example embodiments, the dolly 100 may include a pair of handles 106 attached to the frame 102, the handles 106 may be attached to the frame 102 by, e.g., welding and/or fastening, etc., as described above with respect to interconnection of the elongated members 104 of the frame 102. For example, the handles 106 may be attached to the back end 120 of the frame 102, as illustrated in FIG. 2. The handles 106 may also be constructed of elongated tubular members, such as tubular steel. Thus, the user operating the dolly 100 may manipulate the dolly 100 via the handles 106 to tilt the dolly 100 backwards and/or to move the dolly 100 around with the appliance package thereon.

The backwards rotation or tilt of the dolly 100 may be limited by a second pair of wheels 142, 144. In particular, the second pair of wheels may include a second left wheel 142 and a second right wheel 144 that are connected by a second axle 146. Thus, the dolly 100 may be movable by rolling on the first pair of wheels 122, 124 alone, or by rolling on all four wheels 122, 124, 142, and 144, e.g., both pairs of wheels. In some embodiments, e.g., as illustrated in FIGS. 1 and 2, the first pair of wheels 122, 124 and the second pair of wheels 142, 144 may be about the same size. For example, each wheel 122, 124 of the first pair of wheels may define a first diameter and each wheel 142, 144 of the second pair of wheels may define a second diameter, and the first diameter may be approximately equal to the second diameter. As noted above, "approximately" includes within a ten percent margin of error, e.g., the first diameter approximately equal to the second diameter includes the first diameter may be up to ten percent greater or less than the second diameter.

The second pair of wheels 142, 144 may be spaced apart from the first pair of wheels 122, 124. For example, the second pair of wheels 142, 144 may be mounted to the frame 102 via a first arm 140 and a second arm 148. The first arm 140 and the second arm 148 may be parallel to each other and spaced apart from each other along the lateral direction L. The first and second arms 140, 148 may be attached to the frame 102 and oriented at an oblique angle Θ within a plane defined by the vertical direction V and the transverse direction T. In some embodiments, e.g., as illustrated in FIG. 2, the oblique angle Θ may be approximately sixty degrees (60°) from the transverse direction T.

As mentioned above, the appliance package generally includes at least a box with a separate lid attached to a top of the box. In some embodiments, the dolly 100 may also include a plate 128 configured to engage with an appliance package between a box of the appliance package and a lid of the appliance package. When the plate 128 is so engaged, the package may thereby be secured on the dolly 100. The plate 128 may be disposed on the frame 102 above the platform 108 along the vertical direction V. The plate 128 may be movable in order to move into engagement with the package, e.g., to slide between the box and the lid of the package. For example, the plate 128 may be movable along the vertical direction V, such as upward, e.g., towards the top end 110 of the frame 102 and/or away from the platform 108, such that the plate 128 may be initially against or proximate a sidewall of the box of the appliance package and may then move upward along the vertical direction V into engagement with the package, e.g., between the lid and the box. Thus, the plate 128 may be movable along the vertical direction V between an engaged position between the box and the lid and a disengaged position where the plate 128 is spaced apart from the box and the lid.

In some embodiments, e.g., as illustrated in FIGS. 1 and 2, the plate 128 may be movable, e.g., may be adjustably positioned on the frame 102 above the platform 108, by a vertical bar 134 which is telescopically connected to, e.g., received within, a base 136. The vertical bar 134 may be joined to the base 136 by a ratchet 138. The base 136 may be connected to the frame 102, such that the vertical bar 134 is attached to the frame 102 by the ratchet 138 and the base 136. Thus, the plate 128 may be mounted on an end 133 of the vertical bar 134 and the vertical bar 128 may thereby be movable along the vertical direction V by adjusting the ratchet 138. In some embodiments, the plate 128 may comprise one or more apertures 130 formed therein. The apertures 130 may reduce the overall weight of the plate 128 and promote balance of the dolly 100, e.g., in particular when the plate 128 is extended vertically.

Figure 3:
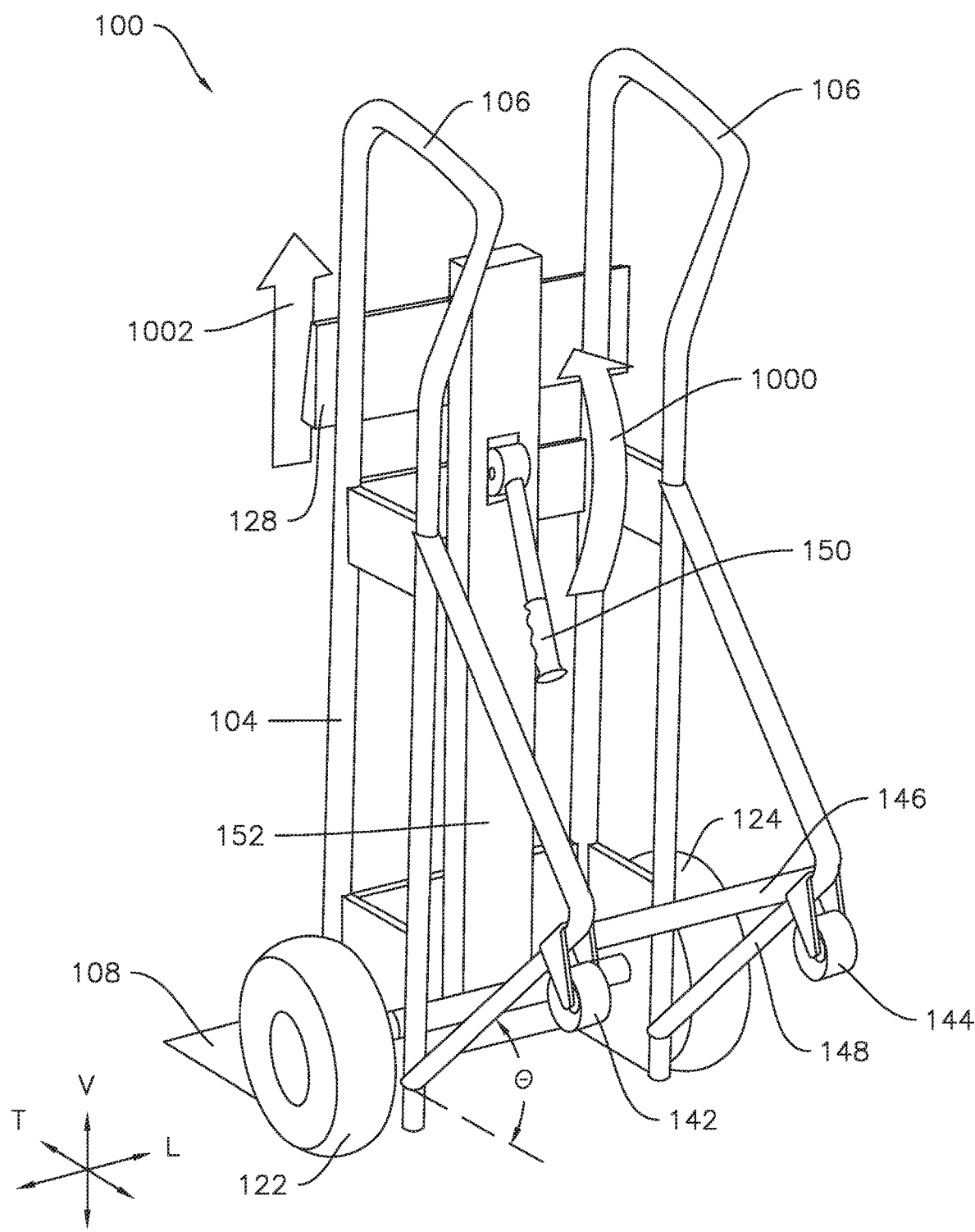
FIG. 3 provides a perspective view of an exemplary appliance dolly in accordance with one or more additional exemplary embodiments of the present subject matter.

Turning now to FIG. 3, an exemplary dolly 100 according to one or more additional embodiments of the present disclosure is illustrated. The dolly 100 of FIG. 3 may include many of the same or similar features as the embodiments of the dolly 100 illustrated in FIGS. 1 and 2. Such overlapping features among the various embodiments, e.g., the frame 102 and the platform 108, will not be revisited in detail in the context of FIG. 3. Rather, it should be understood that aspects of the embodiments described above may also be applicable to the example embodiment of FIG. 3.

As discussed above, the plate 128 may be movable along the vertical direction V. In some embodiments, e.g., as illustrated in FIG. 3, the dolly 100 may include an actuating lever 150 which rotates about the lateral direction L, e.g., as indicated by arrow 1000 in FIG. 3, to move the plate 128 along the vertical direction V. For example the lever 150 may be connected to the vertical bar 134 by a link arm (not shown) disposed within a housing 152 mounted on the frame 102

As discussed above, the first arm 140 and second arm 148 may be oriented at an oblique angle Θ. In some embodiments, e.g., as illustrated in FIG. 3, the oblique angle Θ may be approximately forty-five degrees (45°).

In some embodiments, the second pair of wheels 142, 144 may be smaller than the first pair of wheels 122, 124. For example, as illustrated in FIG. 3, each wheel 122, 124 of the first pair of wheels may define a first diameter, each wheel 142, 144 of the second pair of wheels may define a second diameter, and the first diameter may be greater than the second diameter. For example, the first diameter may be at least fifty percent greater than the second diameter, such as about seventy-five percent greater, such as about one hundred percent greater (e.g., the first diameter may be twice the second diameter), or more.

Additionally, as noted above, features illustrated or described as part of one embodiment can be used with another embodiment to yield a still further embodiment. Thus, for example, the smaller second pair of wheels 142, 144 of FIG. 3 may be provided on a frame 102 as illustrated in FIGS. 1 and 2, or the larger oblique angle Θ of the arms 140, 148 illustrated in FIG. 2 may be provided in the embodiment of FIG. 3. The foregoing are simply examples of possible combinations of the embodiments shown and described herein and many other suitable combinations of features are also possible, as will be understood by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance dolly comprising:
    a frame defining a vertical direction, a lateral direction, and a transverse direction, the vertical direction, the lateral direction, and the transverse direction being mutually perpendicular, the frame extending along the vertical direction from a top end to a bottom end and along the transverse direction from a front end to a back end;
    a platform attached to the front end of the frame at the bottom end of the frame; and
    a plate mounted on an end of a vertical bar, the plate disposed on the frame above the platform along the vertical direction, the vertical bar attached to the frame by a ratchet, wherein the vertical bar is movable along the vertical direction by adjusting the ratchet, thereby moving the plate along the vertical direction between an engaged position and a disengaged position.

2. The appliance dolly of claim 1, further comprising an actuating lever which rotates about the lateral direction to move the plate along the vertical direction.

3. The appliance dolly of claim 1, further comprising a first pair of wheels connected to the back end of the frame at the bottom end of the frame and a second pair of wheels spaced apart from the first pair of wheels.

4. The appliance dolly of claim 3, further comprising a first arm attached to the frame and oriented at an oblique angle within a plane defined by the vertical direction and the transverse direction, and a second arm parallel to the first arm and spaced apart from the first arm along the lateral direction, wherein the second pair of wheels is mounted to the first arm and the second arm.

5. The appliance dolly of claim 4, wherein the oblique angle of the first arm and the second arm is approximately forty-five degrees.

6. The appliance dolly of claim 4, wherein the oblique angle of the first arm and the second arm is approximately sixty degrees from the transverse direction.

7. The appliance dolly of claim 3, wherein each wheel of the first pair of wheels defines a first diameter and each wheel of the second pair of wheels defines a second diameter, and wherein the first diameter is approximately equal to the second diameter.

8. The appliance dolly of claim 3, wherein each wheel of the first pair of wheels defines a first diameter and each wheel of the second pair of wheels defines a second diameter, and wherein the first diameter is at least fifty percent greater than the second diameter.

9. The appliance dolly of claim 1, wherein the platform extends fully across the front end of the frame along the lateral direction.

10. The appliance dolly of claim 1, further comprising an aperture in the plate.

11. An appliance dolly comprising:
    a frame comprising a top end, a bottom end, a front end, and a back end;
    a platform attached to the front end of the frame at the bottom end of the frame; and
    a plate mounted on an end of a vertical bar, the plate disposed on the frame above the platform, the vertical bar is attached to the frame by a ratchet, wherein the vertical bar is movable by adjusting the ratchet, thereby moving the plate between an engaged position and a disengaged position.

12. The appliance dolly of claim 11, further comprising an actuating lever which rotates about the lateral direction to move the plate between the engaged position and the disengaged position.

13. The appliance dolly of claim 11, further comprising a first pair of wheels connected to the back end of the frame at the bottom end of the frame and a second pair of wheels spaced apart from the first pair of wheels.

14. The appliance dolly of claim 13, wherein the second pair of wheels is mounted to a first oblique arm and a second oblique arm.

15. The appliance dolly of claim 13, wherein each wheel of the first pair of wheels defines a first diameter and each wheel of the second pair of wheels defines a second diameter, and wherein the first diameter is approximately equal to the second diameter.

16. The appliance dolly of claim 13, wherein each wheel of the first pair of wheels defines a first diameter and each wheel of the second pair of wheels defines a second diameter, and wherein the first diameter is at least fifty percent greater than the second diameter.

17. The appliance dolly of claim 11, wherein the plate extends fully across the front end of the frame from side to side.

18. The appliance dolly of claim 11, further comprising an aperture in the plate.

\* \* \* \* \*